Sept. 23, 1941.  H. WEBER  2,256,697
REMOTE CONTROL
Filed Aug. 22, 1940
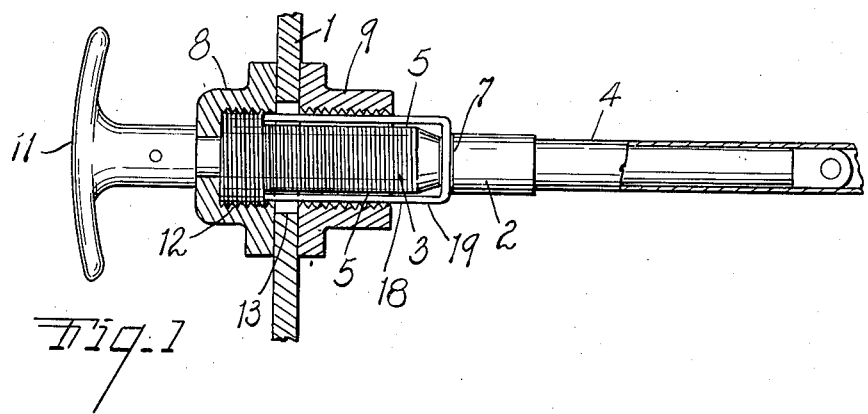
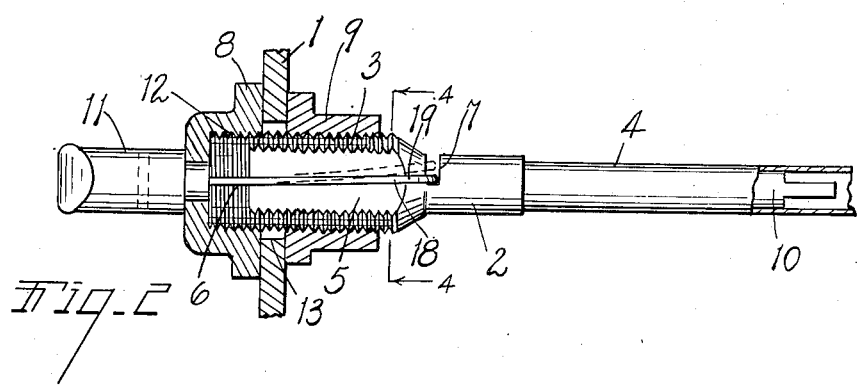
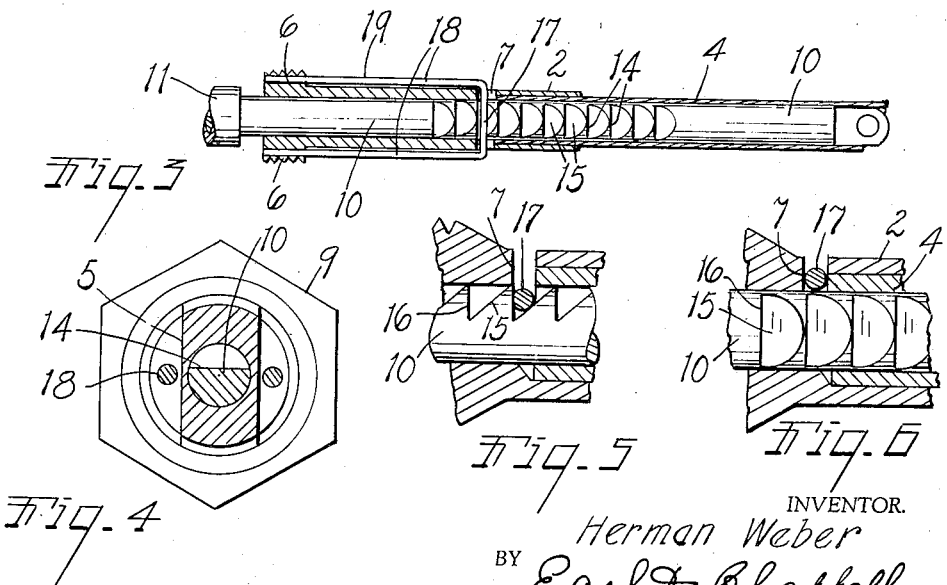
INVENTOR.
Herman Weber
BY Earl T. Chappell
ATTORNEYS Patented Sept. 23, 1941

2,256,697

UNITED STATES PATENT OFFICE 2,256,697

REMOTE CONTROL

Herman Weber, Kalamazoo, Mich., assignor to Shakespeare Products Company, Kalamazoo, Mich.

Application August 22, 1940, Serial No. 353,716

10 Claims. (Cl. 74—503)

This invention relates to improvements in remote controls.

The main objects of this invention are:

First, to provide an improved remote control device which is well adapted for operating parking brakes of automobiles, airplanes and the like, although desirable for other related uses or purposes.

Second, to provide a control device having these advantages which is very simple and compact in structure and in which the parts are so formed and arranged that they may be economically formed and assembled, and the device is not likely to become inoperative through breaking or displacement of any of its parts.

Further objects and objects pertaining to details and economies of construction and operation will appear from the description to follow. The invention is defined in the claims. A preferred embodiment of my invention is illustrated in the accompanying drawing, in which:

Fig. 1 is a fragmentary view partially broken away and partially in longitudinal section of a control device embodying my invention.

Fig. 2 is a fragmentary view partially in longitudinal section and partially broken away, further illustrating the structural details of my invention.

Fig. 3 is a fragmentary view partially in longitudinal section illustrating further details.

Fig. 4 is an enlarged transverse section on line 4—4 of Fig. 2.

Fig. 5 is an enlarged fragmentary view partially in section illustrating the relation of the parts when they are in locking or actuated position.

Fig. 6 is a view similar to that of Fig. 5, illustrating the parts in unlocked or released position.

My present invention relates to an improvement and in some respects an adaptation of the remote control of my application for Letters Patent Serial No. 329,451, filed April 13, 1940. In the embodiment of my invention illustrated, 1 represents the instrument panel or board of an automotive vehicle, airplane or the like. My control device comprises a tubular support member 2 having an enlarged externally threaded portion 3 at its front or forward end and a tubular extension 4. The extension 4 is preferably formed as a piece of tubing and is telescoped into the member 2 which is commonly formed as a screw machine part. The externally threaded portion 3 has opposed flattened sides 5, the extreme front end having longitudinal grooves or recesses 6 therein. At the rear of its enlarged portion, the support member has a transverse slot 7.

The head piece 8 is threaded upon the front end of the support or body member 2 and constitutes a mounting member coacting with the clamping sleeve 9 which is threaded upon the support at the rear or inner side of the panel 1 to clamp the support to the panel 1. The control rod 10 is longitudinally and rotatively adjustable in the support, being provided with a hand piece 11 at its front end, the head member 8 having a central hole 12 therein registering with the bore 13 of the support. The control rod has a plurality or series of ratchet teeth 14, these teeth being provided with rearwardly inclined faces 15 and substantially radial faces 16, so that when the control rod is pulled forward the detent portion 17 of the spring ratchet pawl 18 may ratchet over the teeth, riding up the inclined faces 15 thereof but having locking engagement with the substantially radial surfaces 16 thereof. This ratchet pawl is preferably in the form of a U-shaped spring member 19 disposed to embrace the flattened sides 5 of the support with its ends engaged in the grooves or recesses 6. Its bight or detent portion 17 lies in the transverse slot 7.

The head member 8 serves as a retaining means for the arms of the spring pawl, that is, it prevents their springing laterally out of the grooves. Longitudinal movement thereof is prevented by engagement of the bight portion within the transverse slot.

As stated, the control rod is mounted for rotative as well as longitudinal movement and when it is desired to disengage the ratchet or detent, the rod is rotated to swing the teeth out of the plane of the detent and thus permit longitudinal movement of the control rod. The control rod is designed to be connected to the part actuated through a suitable flexible cable or other translating device, as may be desired for the particular work required. The engagement of the legs of the spring pawl and the recesses is such as to normally urge the pawl to the position shown in full lines in Fig. 2. However, by rotating the control device, it may be swung to the disengaged position as indicated by dotted lines in Fig. 2, so that the parts are at all times under the desired engaging pressure or tension and holding tension.

The parts are very inexpensive to produce and assemble and are so formed that there is no substantial strain or stress thereon when assembled. The structure also has a wide range of uses, permits rapid manipulation to set the brake or actuate the part with which it is associated, and also may be quickly released.

I have illustrated and described my improvements in a very satisfactory embodiment thereof. I have not attempted to illustrate various modifications and adaptations which I contemplate as it is believed that this disclosure will enable those skilled in the art to embody or adapt my improvements as may be desired.

Having thus described my invention, what I claim as new and desire to secure by Letters Patent is:

1. In a control device, the combination of a tubular support provided with an enlarged externally threaded portion at its front end having opposed longitudinal grooves therein and having opposed flattened side portions at the rear of said grooved portion, said support having a transverse slot therein at the rear of its said threaded portion, a head member threaded upon the front end of said support and constituting a mounting member, a clamping sleeve threaded upon said support in opposed relation to said head member, a control rod provided with a hand piece mounted in said support for longitudinal and rotatable adjustment therein and having a plurality of ratchet teeth lying within its circumference, and a U-shaped spring ratchet pawl having the ends of its arms engaged in said grooves and retained therein by said head member, said flattened portions of said support providing clearance for springing movement of said pawl, the bight portion of said pawl constituting a detent disposed in said transverse slot to coact with the teeth of said control rod and being disengageable therefrom by rotative movement of said control rod.

2. In a control device, the combination of a tubular support provided with an enlarged externally threaded portion at its front end having opposed longitudinal grooves therein and having opposed flattened side portions at the rear of said grooved portion, said support having a transverse slot therein at the rear of its said threaded portion, a control rod provided with a hand piece mounted in said support for longitudinal and rotatable adjustment therein and having a plurality of ratchet teeth lying within its circumference, and a U-shaped spring ratchet pawl having the ends of its arms engaged in said grooves, said flattened portions of said support providing clearance for springing movement of said pawl, the bight portion of said pawl constituting a detent disposed in said transverse slot to coact with the teeth of said control rod and being disengageable therefrom by rotative movement of said control rod.

3. In a control device, the combination of a tubular support provided with an externally threaded portion at its front end having opposed longitudinal recesses therein and having opposed flattened side portions at the rear of said recessed portion, said support having a transverse slot therein at the rear of its said threaded portion, a head member threaded upon the front end of said support and constituting a mounting member, a clamping sleeve threaded upon said support in opposed relation to said head member, a control rod provided with a handpiece mounted in said support for longitudinal and rotatable adjustment therein and having a series of teeth, and a U-shaped spring pawl having the ends of its arms engaged in said recesses and retained therein by said head member, said flattened portions of said support providing clearance for springing movement of said pawl, the bight portion of said pawl constituting a detent disposed in said transverse slot to coact with the teeth of said control rod and being disengageable therefrom by rotative movement of said control rod.

4. In a control device, the combination of a tubular support provided with an externally threaded portion at its front end having opposed longitudinal recesses therein and having opposed flattened side portions at the rear of said recessed portion, said support having a transverse slot therein at the rear of its said threaded portion, a control rod provided with a hand piece mounted in said support for longitudinal and rotatable adjustment therein and having a series of teeth, and a U-shaped spring pawl having the ends of its arms engaged in said recesses, said flattened portions of said support providing clearance for springing movement of said pawl, the bight portion of said pawl constituting a detent disposed in said transverse slot to coact with the teeth of said control rod and being disengageable therefrom by rotative movement of said control rod.

5. In a control device, the combination of a tubular support having opposed longitudinal recesses at the forward end thereof and flattened side portions at the rear of such recesses and a transverse slot at the rear of its said flattened side portions, a U-shaped spring ratchet pawl having the ends of its arms engaged in said recesses, the flattened portions of said support providing clearance for springing movement of said pawl, its bight portion being disposed to lie in said transverse slot, a pair of coacting mounting members having threaded engagement with said support and embracing the arms of said pawl, and a control rod mounted in said support for longitudinal and rotative adjustment therein and having a plurality of teeth coacting with said pawl and disengageable therefrom by rotative movement of said control rod.

6. In a control device, the combination of a tubular support having opposed longitudinal recesses at the forward end thereof and flattened side portions at the rear of such recesses and a transverse slot at the rear of its said flattened side portions, a U-shaped spring ratchet pawl having the ends of its arms engaged in said recesses, the flattened portions of said support providing clearance for springing movement of said pawl, its bight portion being disposed to lie in said transverse slot, and a control rod mounted in said support for longitudinal and rotative adjustment therein and having a plurality of teeth coacting with said pawl and disengageable therefrom by rotative movement of said control rod.

7. In a control device, the combination of a tubular support having a longitudinal recess at the forward end thereof and a flattened side portion at the rear of such recess and a transverse slot at the rear of its said flattened side portion, a spring ratchet pawl engaged in said recess, the flattened portion of said support providing clearance for springing movement of said pawl, said pawl having a detent portion lying in said slot, a pair of coacting mounting members having threaded engagement with said support and embracing said pawl, and a control rod mounted in said support for longitudinal and rotative adjustment therein and having a plurality of teeth coacting with said pawl and disengageable therefrom by rotative movement of said control rod.

8. In a control device, the combination of a tubular support having a longitudinal recess at the forward end thereof and a flattened side portion at the rear of such recess and a transverse slot at the rear of its said flattened side portion, a spring ratchet pawl engaged in said recess, the flattened portion of said support providing clearance for springing movement of said pawl, said pawl having a detent portion lying in said slot, and a control rod mounted in said support for longitudinal and rotative adjustment therein and having a plurality of teeth coacting with said pawl and disengageable therefrom by rotative movement of said control rod.

9. A remote control of the type described comprising an elongated tubular support adapted to receive a control rod, said rod having a handle at one end thereof and being adapted to be connected to a member to be actuated at the other, latching teeth on the rod intermediate its ends, and means coacting with said teeth to lock the rod from axial movement when desired, comprising a U-shaped pawl straddling said support, said support having a slot communicating with said teeth and receiving the bight of said element for engagement thereof with the teeth, said slot being axially sustainingly engageable with said bight when the latter is engaged with the teeth, and means for anchoring the extremities of the legs of said pawl against displacement transverse the axis of the support whereby the pawl may be flexed radially of the rod, said rod being rotatable relative to the bight to free the same from engagement by the teeth.

10. A remote control of the type described comprising an elongated tubular support adapted to receive a control rod, said rod having a handle at one end thereof and being adapted to be connected to a member to be actuated at the other, latching teeth on the rod intermediate its ends, and means coacting with said teeth to lock the rod from axial movement when desired, comprising a member having legs straddling said support and a detent connected to the legs, said support having a slot communicating with said teeth and receiving the detent for engagement thereof with the teeth, said slot being axially sustainingly engageable with said detent when the latter is engaged with the teeth, and means for anchoring the legs of said pawl against displacement transverse the axis of the support whereby the pawl may be flexed radially of the rod, said rod being rotatable relative to the detent to free the same from engagement by the teeth.

HERMAN WEBER.